United States Patent
Xu et al.

(10) Patent No.: US 10,199,727 B2
(45) Date of Patent: Feb. 5, 2019

(54) VARIABLE CAPACITOR-BASED ANTENNA ADJUSTMENT METHOD AND RELATED APPARATUS

(71) Applicant: Huawei Technologies Co., Ltd., Shenzhen (CN)

(72) Inventors: Haowei Xu, Shanghai (CN); Jianren Huang, Shanghai (CN); Jianming Li, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 93 days.

(21) Appl. No.: 15/318,624

(22) PCT Filed: Jun. 16, 2014

(86) PCT No.: PCT/CN2014/079931
§ 371 (c)(1),
(2) Date: Dec. 13, 2016

(87) PCT Pub. No.: WO2015/192289
PCT Pub. Date: Dec. 23, 2015

(65) Prior Publication Data
US 2017/0125900 A1    May 4, 2017

(51) Int. Cl.
*H01Q 3/22* (2006.01)
*H01Q 5/321* (2015.01)
(Continued)

(52) U.S. Cl.
CPC .............. *H01Q 3/22* (2013.01); *H01Q 1/243* (2013.01); *H01Q 5/20* (2015.01); *H01Q 5/321* (2015.01);
(Continued)

(58) Field of Classification Search
CPC ........... H01Q 3/22; H01Q 1/243; H01Q 5/321
See application file for complete search history.

(56) References Cited

U.S. PATENT DOCUMENTS

2002/0044092 A1  4/2002 Kushihi
2002/0163475 A1  11/2002 Toncich et al.
(Continued)

FOREIGN PATENT DOCUMENTS

| CN | 1511357 A | 7/2004 |
| CN | 102017300 A | 4/2011 |

(Continued)

OTHER PUBLICATIONS

Machine Translation and Abstract of Korean Publication No. KR19990038835, Jun. 5, 1999, 6 pages.
(Continued)

*Primary Examiner* — Hoang Nguyen
(74) *Attorney, Agent, or Firm* — Conley Rose, P.C.

(57) ABSTRACT

A variable capacitor-based antenna adjustment method and a related apparatus. A first signal strength of a first communications system with a highest priority that is supported by an antenna having a variable capacitor is detected, and when the first signal strength is relatively strong to meet a first release condition, a capacitance value of the variable capacitor is adjusted to a preset capacitance value, where the preset capacitance value is closer to a second capacitance value corresponding to a working frequency band of a second communications system supported by the antenna, so that a working frequency band of the antenna having the variable capacitor is closer to the working frequency band of the second communications system, and therefore, communication quality of the second communications system is improved.

11 Claims, 9 Drawing Sheets

(51) Int. Cl.
*H01Q 5/20* (2015.01)
*H04B 1/18* (2006.01)
*H04W 76/16* (2018.01)
*H01Q 1/24* (2006.01)
*H04W 72/04* (2009.01)

(52) U.S. Cl.
CPC .......... *H04B 1/18* (2013.01); *H04W 72/0453* (2013.01); *H04W 76/16* (2018.02)

(56) References Cited

U.S. PATENT DOCUMENTS

| | | |
|---|---|---|
| 2006/0197711 A1 | 9/2006 | Sekiguchi et al. |
| 2013/0225098 A1 | 8/2013 | Ikehata |
| 2013/0285761 A1 | 10/2013 | Park |
| 2013/0328734 A1 | 12/2013 | Thind |
| 2014/0099903 A1 | 4/2014 | Kim |
| 2014/0125528 A1* | 5/2014 | Tsai ............... H01Q 1/243 343/702 |
| 2014/0145892 A1* | 5/2014 | Tseng ............. H01Q 5/321 343/750 |

FOREIGN PATENT DOCUMENTS

| | | |
|---|---|---|
| CN | 102752007 A | 10/2012 |
| CN | 103155423 A | 6/2013 |
| CN | 203250847 U | 10/2013 |
| CN | 103779669 A | 5/2014 |
| EP | 2717384 A1 | 4/2014 |
| JP | 2002076750 A | 3/2002 |
| JP | 2004320611 A | 11/2004 |
| JP | 2011139202 A | 7/2011 |
| JP | 2014075792 A | 4/2014 |
| KR | 19990038835 A | 6/1999 |
| KR | 20070033015 A | 3/2007 |
| KR | 20140031046 A | 3/2014 |
| WO | 2012057078 A1 | 5/2012 |

OTHER PUBLICATIONS

Foreign Communication From A Counterpart Application, Korean Application No. 2017082851143, Korean Notice of Allowance dated Nov. 27, 2017, 2 pages.
Foreign Communication From A Counterpart Application, Korean Application No. 2017082851143, English Translation of Korean Notice of Allowance dated Nov. 27, 2017, 2 pages.
Machine Translation and Abstract of Chinese Publication No. CN203250847, Oct. 23, 2013, 4 pages.
Foreign Communication From A Counterpart Application, European Application No. 14895204.7, Extended European Search Report dated Apr. 20, 2017, 6 pages.
Foreign Communication From A Counterpart Application, PCT Application No. PCT/CN2014/079931, English Translation of International Search Report dated Feb. 27, 2015, 2 pages.
Foreign Communication From A Counterpart Application, PCT Application No. PCT/CN2014/079931, English Translation of Written Opinion dated Feb. 27, 2015, 7 pages.
Machine Translation and Abstract of Japanese Publication No. JP2011139202, Jul. 14, 2011, 32 pages.
Foreign Communication From a Counterpart Application, Japanese Application No. 2016-570025, Japanese Notice of Allowance dated Jan. 30, 2018, 2 pages.
Machine Translation and Abstract of Chinese Publication No. CN103779669, May 7, 2014, 11 pages.
Foreign Communication From a Counterpart Application, Chinese Application No. 201480012019.6, Chinese Office Action dated Jun. 20, 2017, 5 pages.
Machine Translation and Abstract of Korean Publication No. KR20140031046, Mar. 12, 2014, 11 pages.
Foreign Communication From a Counterpart Application, Korean Application No. 10-2016-7035784, Korean Office Action dated Jul. 26, 2017, 5 pages.
Foreign Communication From a Counterpart Application, Korean Application No. 10-2016-7035784, English Translation of Korean Office Action dated Aug. 8, 2017, 8 pages.

* cited by examiner

VARIABLE CAPACITOR-BASED ANTENNA ADJUSTMENT METHOD AND RELATED APPARATUS

CROSS REFERENCE TO RELATED APPLICATIONS

This application is a U.S. National Stage of International Application No. PCT/CN2014/079931, filed on Jun. 16, 2014, which is hereby incorporated by reference in its entirety.

TECHNICAL FIELD

This application relates to the field of communications technologies, and in particular, to a variable capacitor-based antenna adjustment method and a related apparatus.

BACKGROUND

With development of communications technologies, communications systems using different wireless communications technologies such as a Global System for Mobile Communications (GSM) using a Time Division Multiple Access (TDMA) technology, a voice communications system using a Code Division Multiple Access (CDMA) technology, and a data communications system using a Long Term Evolution (LTE) technology emerge in succession. Different communications systems correspond to different working frequency bands. To enable a mobile terminal to support different communications systems, an antenna of the mobile terminal may cover a relatively wide working frequency band so as to meet communication quality requirements on different communications systems.

To expand a working frequency band of an antenna of a mobile terminal, a variable capacitor is generally disposed in the antenna of the mobile terminal, where different capacitance values of the variable capacitor correspond to different working frequency bands of the antenna. The working frequency band of the antenna can be adjusted by adjusting the capacitance value of the variable capacitor so as to expand the working frequency band of the antenna so that the variable capacitor is applicable to different communications systems and ensures communication quality. An existing adjustment method of an antenna having a variable capacitor is generally setting a priority of a communications system of multiple communications systems supported by the antenna to a highest priority, determining a capacitance value corresponding to a working frequency band of the communications system with the highest priority, and adjusting a capacitance value of the variable capacitor in the antenna to the determined capacitance value. For example, adjusting a working frequency band of the antenna according to the working frequency band of the communications system with the highest priority. Using an antenna that uses a simultaneous GSM and LTE (SGLTE) technology as an example, if a priority of a GSM system is set to be the highest, a capacitance value of a variable capacitor is adjusted to a capacitance value corresponding to a working frequency band of the GSM system. For example, when the working frequency band of the GSM system is GSM 850 megahertz (MHz), the capacitance value is adjusted to a capacitance value corresponding to GSM 850 MHz regardless of a working frequency band of an LTE system so that communication quality of the GSM system implementing a voice service is the best, but communication quality of the LTE system implementing a data service is very poor.

It can be seen that the adjustment method can only ensure communication quality of a system with a highest priority but cannot give consideration to communication quality of another system with a low priority that is supported by the antenna. Therefore, the adjustment method cannot be applicable to a scenario in which there is a particular requirement on the communication quality of the system with a low priority.

SUMMARY

Embodiments of this application provide a variable capacitor-based antenna adjustment method and a related apparatus so as to resolve a problem that a common antenna adjustment method cannot give consideration to communication quality of multiple systems supported by an antenna and has limited application scenarios.

To resolve the foregoing technical problem, the embodiments of this application disclose the following technical solutions.

According to a first aspect, a variable capacitor-based antenna adjustment method is provided and is applied to an antenna having a variable capacitor, where the antenna having the variable capacitor supports at least two communications systems. The antenna adjustment method includes detecting a first signal strength of a first communications system supported by the antenna having the variable capacitor, determining whether the first signal strength meets a first release condition, where the first release condition includes the first signal strength is greater than a first threshold, or the first signal strength is not less than the first threshold, and when the first signal strength meets the first release condition, adjusting a capacitance value of the variable capacitor to a preset capacitance value, where the preset capacitance value is between the first capacitance value and a second capacitance value, or equal to the second capacitance value, where the first capacitance value is a capacitance value corresponding to a working frequency band of the first communications system, and the second capacitance value is a capacitance value corresponding to a working frequency band of a second communications system supported by the antenna having the variable capacitor.

With reference to the first aspect, in a first possible implementation manner of the first aspect, the antenna adjustment method further includes, when the first signal strength does not meet the first release condition, adjusting the capacitance value of the variable capacitor to the first capacitance value.

With reference to the first aspect, in a second possible implementation manner of the first aspect, the antenna adjustment method further includes, when the first signal strength does not meet the first release condition, determining whether the first signal strength meets a first recycling condition, and when the first signal strength meets the first recycling condition, adjusting the capacitance value of the variable capacitor to the first capacitance value, where the first recycling condition includes the first signal strength is less than a first recycling threshold, or the first signal strength is not greater than the first recycling threshold, and the first recycling threshold is less than the first threshold.

With reference to the first aspect, or the first possible implementation manner of the first aspect, or the second possible implementation manner of the first aspect, in a third possible implementation manner of the first aspect, the adjusting a capacitance value of the variable capacitor to a preset capacitance value includes determining whether the first signal strength meets a second release condition, and when the first signal strength meets the second release condition, adjusting the capacitance value of the variable capacitor to the second capacitance value, where the second release condition includes the first signal strength is greater than a second threshold, or the first signal strength is not less than the second threshold, and the second threshold is greater than the first threshold.

With reference to the third possible implementation manner of the first aspect, in a fourth possible implementation manner of the first aspect, the antenna adjustment method further includes, when the first signal strength does not meet the second release condition, adjusting the capacitance value of the variable capacitor to a first preset capacitance value, where the preset capacitance value includes the first preset capacitance value, and the first preset capacitance value is between the first capacitance value and the second capacitance value, or when the first signal strength does not meet the second release condition, determining whether the first signal strength meets a second recycling condition, and when the first signal strength meets the second recycling condition, adjusting the capacitance value of the variable capacitor to the first preset capacitance value, where the second recycling condition includes the first signal strength is less than a second recycling threshold, or the first signal strength is not greater than a second recycling threshold, and the second recycling threshold is between the first threshold and the second threshold.

According to a second aspect, a variable capacitor-based antenna adjustment apparatus is provided, and is applied to an antenna having a variable capacitor, where the antenna having the variable capacitor supports at least two communications systems and the antenna adjustment apparatus includes a signal detection unit configured to detect a first signal strength of a first communications system supported by the antenna having the variable capacitor, a first release determining unit configured to determine whether the first signal strength meets a first release condition, where the first release condition includes the first signal strength is greater than a first threshold, or the first signal strength is not less than the first threshold, and a first adjustment unit configured to, when the first signal strength meets the first release condition, adjust a capacitance value of the variable capacitor to a preset capacitance value, where the preset capacitance value is between the first capacitance value and a second capacitance value, or equal to the second capacitance value, where the first capacitance value is a capacitance value corresponding to a working frequency band of the first communications system, and the second capacitance value is a capacitance value corresponding to a working frequency band of a second communications system supported by the antenna having the variable capacitor.

With reference to the second aspect, in a first possible implementation manner of the second aspect, the antenna adjustment apparatus further includes a second adjustment unit configured to, when the first signal strength does not meet the first release condition, adjust the capacitance value of the variable capacitor to the first capacitance value.

With reference to the second aspect, in a second possible implementation manner of the second aspect, the antenna adjustment apparatus further includes a first recycling determining unit configured to, when the first signal strength does not meet the first release condition, determine whether the first signal strength meets a first recycling condition, and a third adjustment unit configured to, when the first signal strength meets the first recycling condition, adjust the capacitance value of the variable capacitor to the first capacitance value, where the first recycling condition includes the first signal strength is less than a first recycling threshold, or the first signal strength is not greater than the first recycling threshold, and the first recycling threshold is less than the first threshold.

With reference to the second aspect, or the first possible implementation manner of the second aspect, or the second possible implementation manner of the second aspect, in a third possible implementation manner of the second aspect, the first adjustment unit includes a second release determining unit configured to determine whether the first signal strength meets a second release condition, and a first adjustment subunit configured to, when the first signal strength meets the second release condition, adjust the capacitance value of the variable capacitor to the second capacitance value, where the second release condition includes the first signal strength is greater than a second threshold, or the first signal strength is not less than the second threshold, and the second threshold is greater than the first threshold.

With reference to the third possible implementation manner of the second aspect, in a fourth possible implementation manner of the second aspect, the first adjustment unit further includes a second adjustment subunit configured to, when the first signal strength does not meet the second release condition, adjust the capacitance value of the variable capacitor to a first preset capacitance value, where the preset capacitance value includes the first preset capacitance value, and the first preset capacitance value is between the first capacitance value and the second capacitance value, or a second recycling determining unit configured to, when the first signal strength does not meet the second release condition, determine whether the first signal strength meets a second recycling condition, and a third adjustment subunit configured to, when the first signal strength meets the second recycling condition, adjust the capacitance value of the variable capacitor to the first preset capacitance value, where the second recycling condition includes the first signal strength is less than a second recycling threshold, or the first signal strength is not greater than a second recycling threshold, and the second recycling threshold is between the first threshold and the second threshold.

According to a third aspect, a wireless communications terminal is provided, where the wireless communications terminal includes an antenna having a variable capacitor and an antenna adjuster, where the antenna having the variable capacitor supports at least two communications systems, and the antenna adjuster is configured to detect a first signal strength of a first communications system supported by the antenna having the variable capacitor, and when the first signal strength meets a first release condition, adjust a capacitance value of the variable capacitor to a preset capacitance value, where the first release condition includes the first signal strength is greater than a first threshold, or the first signal strength is not less than the first threshold, the preset capacitance value is between the first capacitance value and a second capacitance value, or equal to the second capacitance value, the first capacitance value is a capacitance value corresponding to a working frequency band of the first communications system, and the second capacitance value is a capacitance value corresponding to a working frequency band of a second communications system supported by the antenna having the variable capacitor.

It can be seen from the foregoing technical solutions that, in the embodiments of this application, a first signal strength of a first communications system with a highest priority that is supported by an antenna having a variable capacitor is detected, and when the first signal strength is relatively strong to meet a first release condition, a capacitance value of the variable capacitor is adjusted to a preset capacitance value, where the preset capacitance value is closer to a second capacitance value corresponding to a working frequency band of a second communications system supported by the antenna so that a working frequency band of the antenna having the variable capacitor is closer to the working frequency band of the second communications system, and therefore, communication quality of the second communications system is improved. Although the first signal strength is attenuated, because the first signal strength is very strong before the attenuation, the attenuated first signal strength can still meet a communication quality requirement on the first communications system. Therefore, compared with a conventional method in which the capacitance value is always set to a capacitance value corresponding to a working frequency band of the first communications system, the antenna adjustment method provided by the embodiments of this application can not only preferentially meet the communication quality requirement on the first communications system with a relatively high priority, but also can improve, when a signal of the first communications system is very strong, the communication quality of the second communications system with a relatively low priority by adjusting the capacitance value of the variable capacitor, thereby achieving an objective of giving consideration to communication quality of multiple systems supported by the antenna having the variable capacitor.

BRIEF DESCRIPTION OF DRAWINGS

To describe the technical solutions in the embodiments of this application or in the prior art more clearly, the following briefly describes the accompanying drawings required for describing the embodiments or the prior art. A person of ordinary skill in the art may still derive other drawings from these accompanying drawings without creative efforts.

DESCRIPTION OF EMBODIMENTS

Embodiments of this application provide a variable capacitor-based antenna adjustment method and a related apparatus so as to resolve a problem that a common antenna adjustment method cannot give consideration to communication quality of multiple systems supported by an antenna and has limited application scenarios.

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

Figure 1:
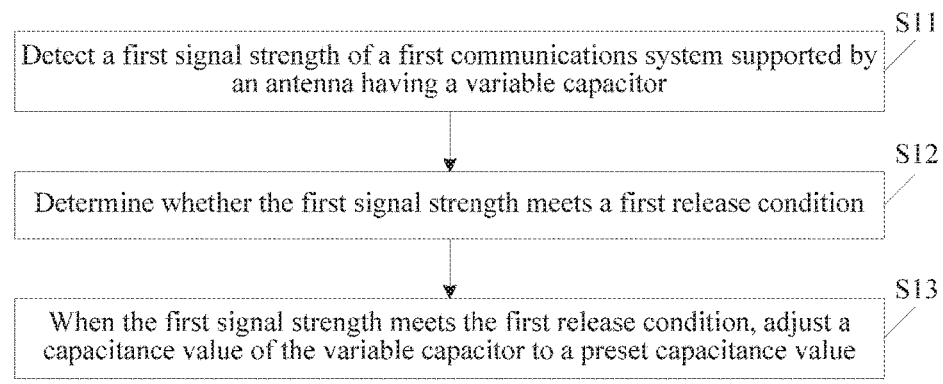
FIG. 1 is a schematic flowchart of a variable capacitor-based antenna adjustment method according to an embodiment of this application.

FIG. 1 is a schematic flowchart of a variable capacitor-based antenna adjustment method according to an embodiment of this application, where the antenna adjustment method is applied to an antenna having a variable capacitor, and the antenna having the variable capacitor supports at least two communications systems. In an actual application, an apparatus that performs the antenna adjustment method may be entirely or partially integrated into the antenna, or may be disposed in a wireless communications terminal independent of the antenna.

Referring to FIG. 1, the variable capacitor-based antenna adjustment method provided by this embodiment of this application includes the following steps.

S11: Detect a first signal strength of a first communications system supported by the antenna having the variable capacitor.

S12: Determine whether the first signal strength meets a first release condition.

The first release condition may be that the first signal strength is greater than a first threshold or the first signal strength is not less than the first threshold.

S13: When the first signal strength meets the first release condition, adjust a capacitance value of the variable capacitor to a preset capacitance value.

The preset capacitance value is between the first capacitance value and a second capacitance value, or equal to the second capacitance value. The first capacitance value is a capacitance value corresponding to a working frequency band of the first communications system and the second capacitance value is a capacitance value corresponding to a working frequency band of a second communications system supported by the antenna having the variable capacitor. The first communications system has a priority higher than that of the second communications system.

In an actual application, a working frequency band of the antenna having the variable capacitor may be increased as a capacitance value of the variable capacitor is increased. Correspondingly, the first capacitance value is less than the second capacitance value, the preset capacitance value is greater than the first capacitance value, and the preset capacitance value is less than or equal to the second capacitance value. The working frequency band of the antenna having the variable capacitor may be decreased as the capacitance value of the variable capacitor is decreased.

Correspondingly, the first capacitance value is greater than the second capacitance value, the preset capacitance value is less than the first capacitance value, and the preset capacitance value is greater than or equal to the second capacitance value.

Optionally, an antenna adjustment period T is set and the antenna adjustment method is performed once within each antenna adjustment period T to automatically and circularly perform the antenna adjustment method. A smaller T indicates more frequent adjustment of the working frequency band of the antenna so that communication quality of each communications system can be better ensured.

The antenna having the variable capacitor may be any one of the following.

1) An antenna based on an SGLTE technology, which is generally used for diversity sharing between a GSM system and an LTE system.

2) An antenna based on a simultaneous voice and LTE (SVLTE) technology, which is generally used for diversity sharing between a CDMA system and an LTE system.

3) An antenna based on an LTE carrier aggregation (CA) technology, which is used for diversity sharing between an LTE policy and charging control (PCC) system and an LTE secondary common control (SCC) system.

4) An antenna based on a dual subscriber identity module technology, which is generally used for diversity sharing between a GSM network and an LTE network.

Using the foregoing antenna based on the SGLTE technology as an example, two communications systems supported by the antenna are a GSM 850 system and an LTE B38 system respectively, and it is assumed that the GSM850 system has a priority higher than that of the LTE B38 system, and a first threshold may be set to −85 decibel-milliwatts (dBm). For example, as long as a first signal strength of the GSM 850 system reaches −85 dBm, a communication quality requirement on the GSM 850 system can be met. Therefore, when the first signal strength of the GSM 850 system is greater than −85 dBm, a capacitance value of a variable capacitor is adjusted to a preset capacitance value. For example, when the first signal strength of the GSM 850 system is −70 dBm, the capacitance value of the variable capacitor may be adjusted to a capacitance value corresponding to a working frequency band of a GSM 1800 system so that a working frequency band of the antenna is closer to a working frequency band of the LTE system, and therefore, a second signal strength of the LTE system is increased. Correspondingly, the first signal strength of the GSM 850 system is reduced. An actual measurement result shows that, before the adjustment, for example, when the capacitance value of the variable capacitor is a capacitance value corresponding to a working frequency band of the GSM 850 system, the first signal strength is not attenuated, and the second signal strength is attenuated by 2 decibels (dB). After the adjustment, for example, after the capacitance value of the variable capacitor is the capacitance value corresponding to the working frequency band of the GSM 1800 system, the first signal strength is attenuated by 13.5 dB and the second signal strength is attenuated by only 0.5 dB. For example, after the adjustment, the second signal strength is increased by 1.5 dB and communication quality of the LTE system is improved. The first signal strength is attenuated by 13.5 dB and is changed to −83.5 dBm but is still higher than −85 dBm so that the communications quality requirement on the GSM 850 system can still be met.

In this embodiment of this application, when the first signal strength meets the first release condition, it indicates that a signal strength of the first communications system can meet a communication quality requirement on the first communications system; and in this case, compared with an existing antenna adjustment method in which the capacitance value of the variable capacitor is always maintained at the first capacitance value, in this embodiment of this application, the capacitance value of the variable capacitor is adjusted to the preset capacitance value, and because compared with the first capacitance value, the preset capacitance value is closer to the second capacitance value, after the adjustment, the working frequency band of the antenna having the variable capacitor is closer to the working frequency band of the second communications system, and therefore, a second signal strength of the second communications system is increased and communication quality is improved. Although the first signal strength is attenuated (equivalent to that a small part of a signal of the first communications system is released), and because the first signal strength is very strong before the attenuation, the first signal strength after the attenuation can still meet the communication quality requirement on the first communications system. Therefore, the antenna adjustment method provided by this embodiment of this application is applied so that not only the communication quality requirement on the first communications system with a relatively high priority is preferentially met, but also the communication quality of the second communications system with a relatively low priority is improved when a signal of the first communications system is very strong by adjusting the capacitance value of the variable capacitor, thereby achieving an objective of giving consideration to communication quality of multiple systems supported by the antenna having the variable capacitor.

Optionally, in this embodiment of this application, when the first signal strength does not meet the first release condition, the capacitance value of the variable capacitor is adjusted to the first capacitance value.

When the first signal strength does not meet the first release condition, it indicates that the signal strength of the first communications system is relatively weak. In this case, the capacitance value of the variable capacitor is set to the capacitance value corresponding to the working frequency band of the first communications system (for example, the first capacitance value) so that the communication quality requirement on the first communications system with a relatively high priority can be preferentially met.

The foregoing embodiment can achieve the objective of giving consideration to the communication quality of the multiple systems supported by the antenna having the variable capacitor and is applicable to a scenario in which a fluctuation of a signal strength is not great.

In a case in which a fluctuation of the first signal strength is relatively great, especially when the first signal strength fluctuates around the set first threshold, the capacitance value of the variable capacitor is frequently switched between the first capacitance value and the preset capacitance value (for example, a ping-pong effect), which leads to a hazard such as damage to the variable capacitor and reduction of the service life. To enable the antenna having the variable capacitor to support the multiple communications systems and reduce a quantity of times of adjustment of the capacitance value of the variable capacitor, an embodiment of this application provides another adjustment method of an antenna having a variable capacitor shown in FIG. 2.

Figure 2:
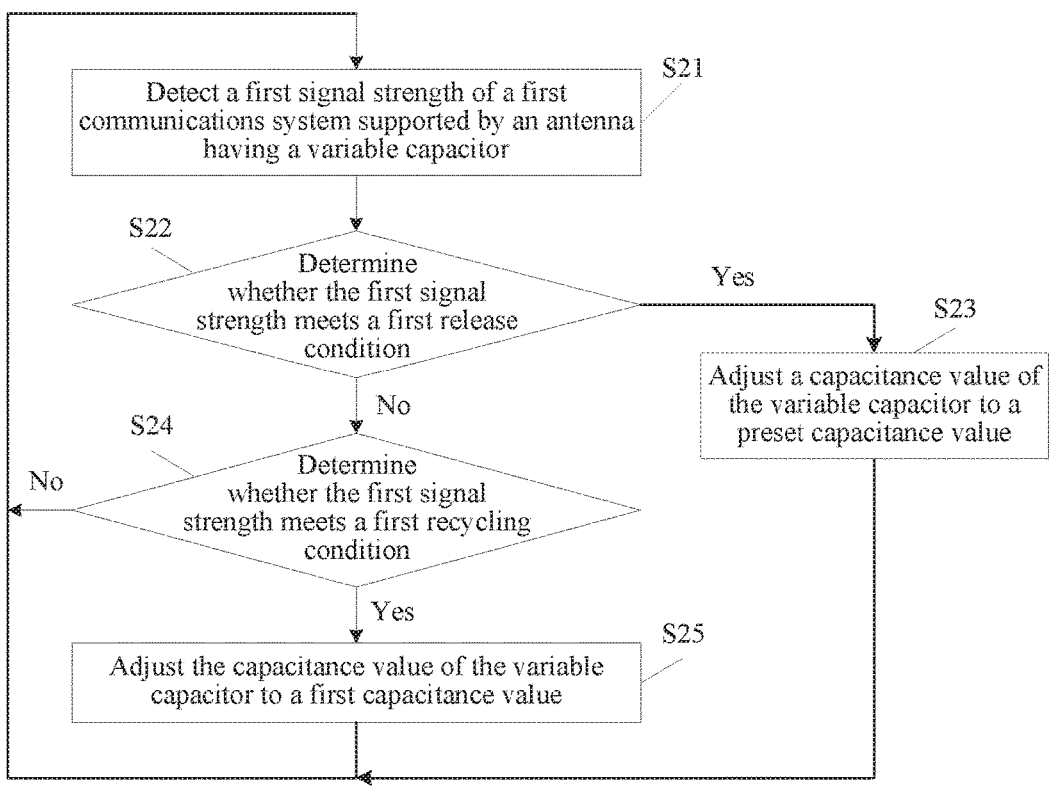
FIG. 2 is a schematic flowchart of another variable capacitor-based antenna adjustment method according to an embodiment of this application.

Referring to FIG. 2, the adjustment method of an antenna having a variable capacitor includes the following steps.

S21: Detect a first signal strength of a first communications system supported by the antenna having the variable capacitor.

S22: Determine whether the first signal strength meets a first release condition, and if the first signal strength meets the first release condition, perform step S23; otherwise, perform step S24.

The first release condition includes the first signal strength is greater than a first threshold or the first signal strength is not less than the first threshold.

S23: Adjust a capacitance value of the variable capacitor to a preset capacitance value and go back to step S21.

The preset capacitance value is between the first capacitance value and a second capacitance value, or equal to the second capacitance value. The first capacitance value is a capacitance value corresponding to a working frequency band of the first communications system, and the second capacitance value is a capacitance value corresponding to a working frequency band of a second communications system supported by the antenna having the variable capacitor. The first communications system has a priority higher than that of the second communications system.

In an actual application, a working frequency band of the antenna having the variable capacitor may be increased as a capacitance value of the variable capacitor is increased. Correspondingly, the first capacitance value is less than the second capacitance value, the preset capacitance value is greater than the first capacitance value, and the preset capacitance value is less than or equal to the second capacitance value. The working frequency band of the antenna having the variable capacitor may be decreased as the capacitance value of the variable capacitor is decreased. Correspondingly, the first capacitance value is greater than the second capacitance value, the preset capacitance value is less than the first capacitance value, and the preset capacitance value is greater than or equal to the second capacitance value.

S24: Determine whether the first signal strength meets a first recycling condition, and if the first signal strength meets the first recycling condition, perform step S25; otherwise, go back to step S21.

The first recycling condition includes the first signal strength is less than a first recycling threshold or the first signal strength is not greater than the first recycling threshold, and the first recycling threshold is less than the first threshold. The first recycling threshold may be set according to a communication quality requirement on the first communications system in an actual scenario, and generally, the first recycling threshold is not less than a minimum signal strength required by the communication quality requirement on the first communications system. For example, according to a communication quality requirement on the first communications system in a particular application scenario, when the first signal strength of the first communications system is less than −100 dBm, communication quality of the first communications system is affected. In this case, a value of the capacitance value of the variable capacitor must ensure that a signal of the first communications system is not attenuated or is still not less than −100 dBm after attenuation; and the first recycling threshold may be set to −90 dBm. When the first signal strength is less than −90 dBm, the capacitance value is set to the first capacitance value so that the working frequency band of the antenna is the same as the working frequency band of the first communications system, thereby preventing signal attenuation of the first communications system due to inconsistent working frequency bands of the antenna and the first communications system and ensuring the communication quality of the first communications system.

S25: Adjust the capacitance value of the variable capacitor to the first capacitance value and go back to step S21.

Figure 3:
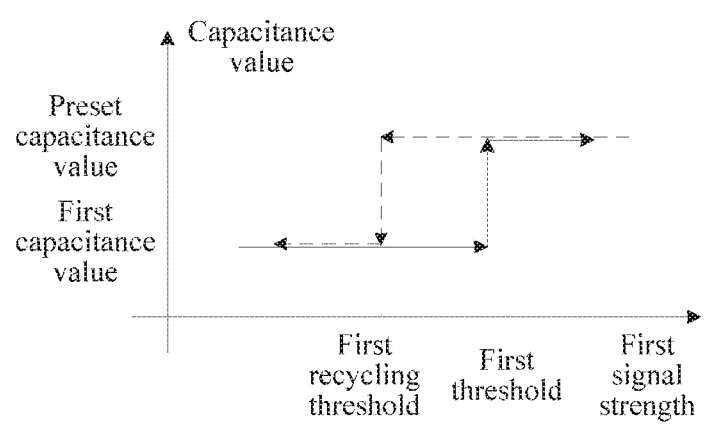
FIG. 3 is a schematic diagram of a variation relationship between a first signal strength and a capacitance value in the antenna adjustment method shown in FIG. 2.

FIG. 3 shows a variation relationship between the first signal strength and the capacitance value when the working frequency band of the antenna is increased as the capacitance value of the variable capacitor is increased. As shown in FIG. 3, when the first signal strength is greater than the first threshold (the first release condition is met), the capacitance value of the variable capacitor is adjusted to the preset capacitance value, when the first signal strength is less than the first recycling threshold (the first recycling condition is met), the capacitance value of the variable capacitor is adjusted to the first capacitance value, and when the first signal strength is between the first recycling threshold and the first threshold, the capacitance value of the variable capacitor remains unchanged and go back to step S21 to re-detect first signal strength, which includes the following two cases. If a detected previous first signal strength is greater than the first threshold, and a corresponding capacitance value of the variable capacitor is the preset capacitance value, when a detected current first signal strength is decreased between the first recycling threshold and the first threshold, the variable capacitor is maintained at the preset capacitance value. If the detected previous first signal strength is less than the first recycling threshold, and a corresponding capacitance value is the first capacitance value, when the detected current first signal strength is increased between the first recycling threshold and the first threshold, the variable capacitor is maintained at the first capacitance value.

In addition, according to different requirements, in different scenarios, on communication quality of each system supported by the antenna, a difference between the first recycling threshold and the first threshold may be appropriately increased or decreased, and a smaller difference indicates a higher sensitivity of variation of the capacitance value with a signal strength and greater damage to the variable capacitor. For example, when a communication quality requirement on the second communications system with a relatively low priority is very low, in a case in which the first recycling threshold is fixed, the first threshold may be increased to try to ensure as far as possible that the signal strength of the first communications system is not attenuated; otherwise, if there is a particular requirement on the communication quality of the second communications system, the first threshold may be appropriately decreased, and when the communication quality requirement on the first communications system is very high, a relatively large first recycling threshold may be set in the case in which the first threshold is fixed.

It can be known from the foregoing technical solution that, in this embodiment of this application, a first signal strength of a first communications system with a relatively high priority is detected, whether the first signal strength meets a first release condition and whether the first signal strength meets a first recycling condition are separately determined, and when the first signal strength is increased to meet the first release condition, a capacitance value of a variable capacitor is adjusted to a preset capacitance value so that the first signal strength is attenuated and a second signal strength of a second communications system with a relatively low priority is increased; therefore, not only a communication quality requirement on the first communications system can be met, but also communication quality of the second communications system can be improved, the capacitance value of the variable capacitor is adjusted to a first capacitance value when and only when the first signal strength is attenuated to meet the first recycling condition so that the first signal strength is increased to ensure communication quality of the first communications system, and when the first signal strength neither meets the first recycling condition nor meets the first release condition, the capacitance value of the variable capacitor remains unchanged. This embodiment is applied so that not only an objective of giving consideration to communication quality of multiple systems supported by an antenna having the variable capacitor is achieved, but also a quantity of times of adjustment of the variable capacitor can be reduced, thereby preventing a "ping-pong effect" of the capacitance value of the variable capacitor and reducing damage to the variable capacitor.

Figure 4:
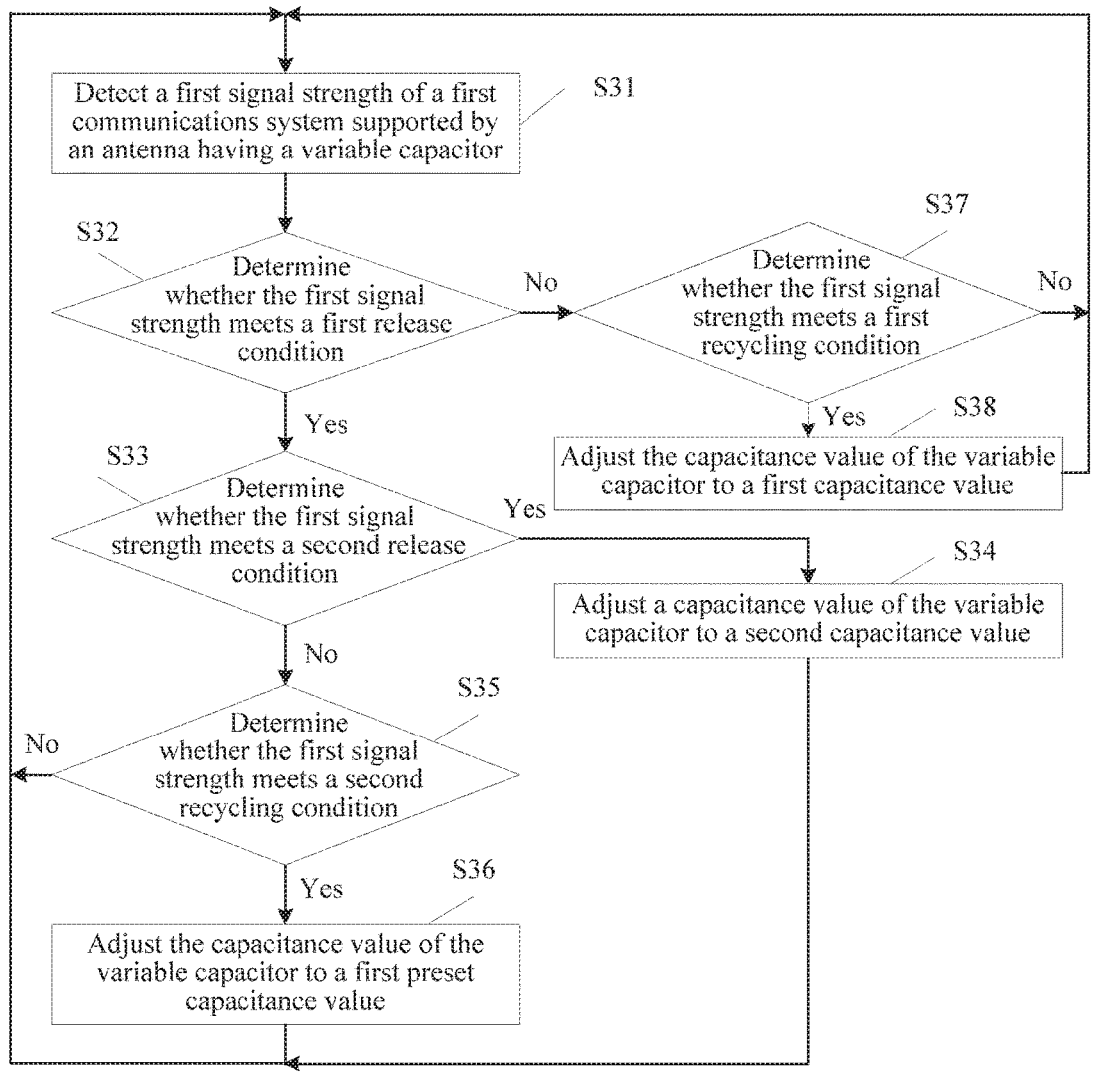
FIG. 4 is a schematic flowchart of still another variable capacitor-based antenna adjustment method according to an embodiment of this application.
Figure 5:
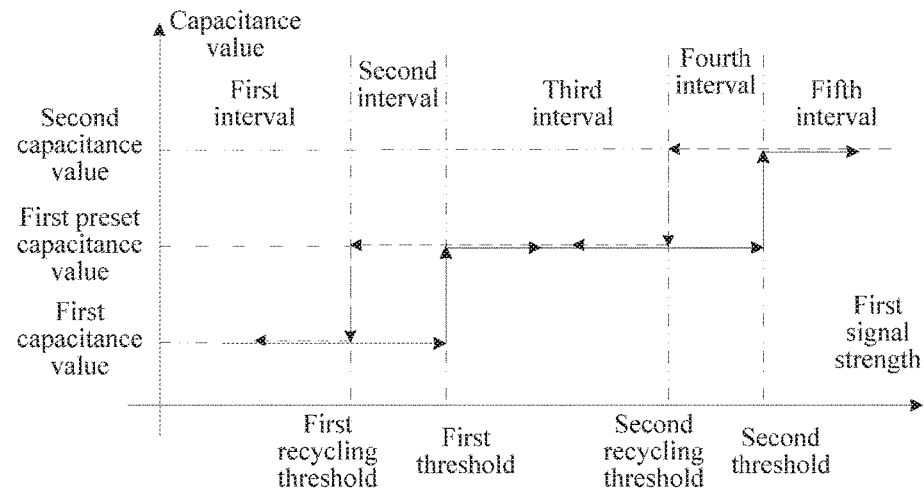
FIG. 5 is a schematic diagram of a variation relationship between a first signal strength and a capacitance value in the antenna adjustment method shown in FIG. 4.

FIG. 4 is a flowchart of still another variable capacitor-based antenna adjustment method according to an embodiment of this application, where the variable capacitor is disposed on the antenna and is used to adjust a working frequency band of the antenna, and the antenna supports at least two communications systems. FIG. 5 is a schematic diagram of a variation relationship between a first signal strength and a capacitance value of the variable capacitor in the antenna adjustment method shown in FIG. 4 when a working frequency band of the antenna is increased as the capacitance value of the variable capacitor is increased.

Referring to FIG. 4 and FIG. 5, the antenna adjustment method includes the following steps.

S31: Detect a first signal strength of a first communications system supported by the antenna having the variable capacitor.

S32: Determine whether the first signal strength meets a first release condition and if the first signal strength meets the first release condition, perform step S33; otherwise, perform step S37.

The first release condition includes the first signal strength is greater than a first threshold or the first signal strength is not less than the first threshold.

S33: Determine whether the first signal strength meets a second release condition and if the first signal strength meets the second release condition, perform step S34; otherwise, perform step S35.

The second release condition includes the first signal strength is greater than a second threshold or the first signal strength is not less than the second threshold, and the second threshold is greater than the first threshold.

S34: Adjust a capacitance value of the variable capacitor to a second capacitance value and go back to step S31.

The second capacitance value is a capacitance value corresponding to a working frequency band of a second communications system supported by the antenna having the variable capacitor. The first communications system has a priority higher than that of the second communications system.

S35: Determine whether the first signal strength meets a second recycling condition and if the first signal strength meets the second recycling condition, perform step S36; otherwise, go back to step S31.

The second recycling condition includes the first signal strength is less than a second recycling threshold or the first signal strength is not greater than a second recycling threshold, and the second recycling threshold is between the first threshold and the second threshold. The second recycling threshold may be set to a minimum value of the first signal strength that makes the second communications system achieve best communication quality under the premise that a communication quality requirement on the first communications system is met.

S36: Adjust the capacitance value of the variable capacitor to a first preset capacitance value and go back to step S31.

The first preset capacitance value is greater than a first capacitance value, the first preset capacitance value is less than the second capacitance value, and the first capacitance value is a capacitance value corresponding to a working frequency band of the first communications system.

S37: Determine whether the first signal strength meets a first recycling condition and if the first signal strength meets the first recycling condition, perform step S38; otherwise, go back to step S31.

The first recycling condition includes the first signal strength is less than a first recycling threshold or the first signal strength is not greater than the first recycling threshold, and the first recycling threshold is less than the first threshold. The first recycling threshold may be set according to a communication quality requirement on the first communications system in an actual scenario, and generally, the first recycling threshold is not less than a minimum signal strength required by the communication quality requirement on the first communications system.

S38: Adjust the capacitance value of the variable capacitor to a first capacitance value, and go back to step S31.

In this embodiment of this application, not only the first threshold and the first recycling threshold are set, but also the second threshold and the second recycling threshold are set and the capacitance value of the variable capacitor is adjusted according to a signal strength of the first communications system. As shown in FIG. 5, the variation relationship between the first signal strength and the capacitance value may be classified into the following five cases.

Case 1: When the first signal strength is less than the first recycling threshold, for example, located within a first interval (the first recycling condition is met), it indicates that the signal strength of the first communications system is relatively weak and even cannot meet the communication quality requirement on the first communications system. Therefore, in this embodiment, the capacitance value of the variable capacitor is adjusted to the first capacitance value so that it can be ensured that the first communications system with a relatively high priority can achieve best communication quality in this case. Correspondingly, the communication quality of the second communications system is relatively poor.

Case 2: When the first signal strength is between the first threshold and the second recycling threshold, for example, located within a third interval (both the first release condition and the second recycling condition are met), it indicates that under the premise that the signal strength of the first communications system meets the communication quality requirement on the first communications system, a particular signal margin (for example, a difference between the first signal strength and the first threshold) exists, and the signal margin may be released to be used for the second communications system. Therefore, in this embodiment, the capacitance value is adjusted to the preset capacitance value between the first capacitance value and the second capacitance value so that a working frequency band of the antenna is between the working frequency band of the first communications system and the working frequency band of the second communications system, and the signal margin of the first communications system is released to enhance a signal of the second communications system, thereby improving the communication quality of the second communications system under the premise of not affecting the communication quality of the first communications system.

Case 3: When the first signal strength is greater than the second threshold, for example, located within a fifth interval (the second release condition is met), it indicates that a signal of the first communications system is very strong so that not only the communication quality requirement on the first communications system can be met, but also a very large signal margin exists. Therefore, in this embodiment, the capacitance value is adjusted to the second capacitance value to enable the second communications system to achieve best communication quality, and in the other aspect, although the first signal strength attenuates, the signal margin of the first signal strength is very large before the adjustment so that the attenuated first signal strength can also ensure the communication quality requirement on the first communications system.

Case 4: When the first signal strength is between the first recycling threshold and the first threshold, for example, located within a second interval, the capacitance value remains unchanged, for example, if the first signal strength is increased to the second interval from the first interval, the capacitance value is maintained at the first capacitance value corresponding to the first interval, and if the first signal strength is attenuated to the second interval from the third interval, the capacitance value is maintained at the first preset capacitance value corresponding to the third interval.

Case 5: When the first signal strength is between the second recycling threshold and the second threshold, for example, located within a fourth interval, the capacitance value remains unchanged, for example, if the first signal strength is increased to the fourth interval from the third interval, the capacitance value is maintained at the preset capacitance value corresponding to the third interval, and if the first signal strength is attenuated to the fourth interval from the fifth interval, the capacitance value is maintained at the second capacitance value corresponding to the fifth interval.

It can be known from the foregoing technical solution that, in this embodiment of this application, the first recycling threshold, the first threshold, the second recycling threshold, and the second threshold are set to divide the signal strength into five intervals, and the first interval, the third interval, and the fifth interval respectively correspond to one capacitance value; the first signal strength of the first communications system with a relatively high priority is detected to determine an interval in which the first signal strength is located. If the first signal strength is located within the first interval, or the third interval, or the fifth interval, the capacitance value of the variable capacitor is set to the capacitance value corresponding to the interval, and if the first signal strength is located within the second interval or the fourth interval, the capacitance value is not adjusted so that not only an objective of giving consideration to communication quality of multiple systems supported by the antenna having the variable capacitor is achieved, but also a "ping-pong effect" of the capacitance value of the variable capacitor can be prevented, a quantity of times of adjustment of the variable capacitor is reduced, and damage to the variable capacitor is reduced.

Figure 6:
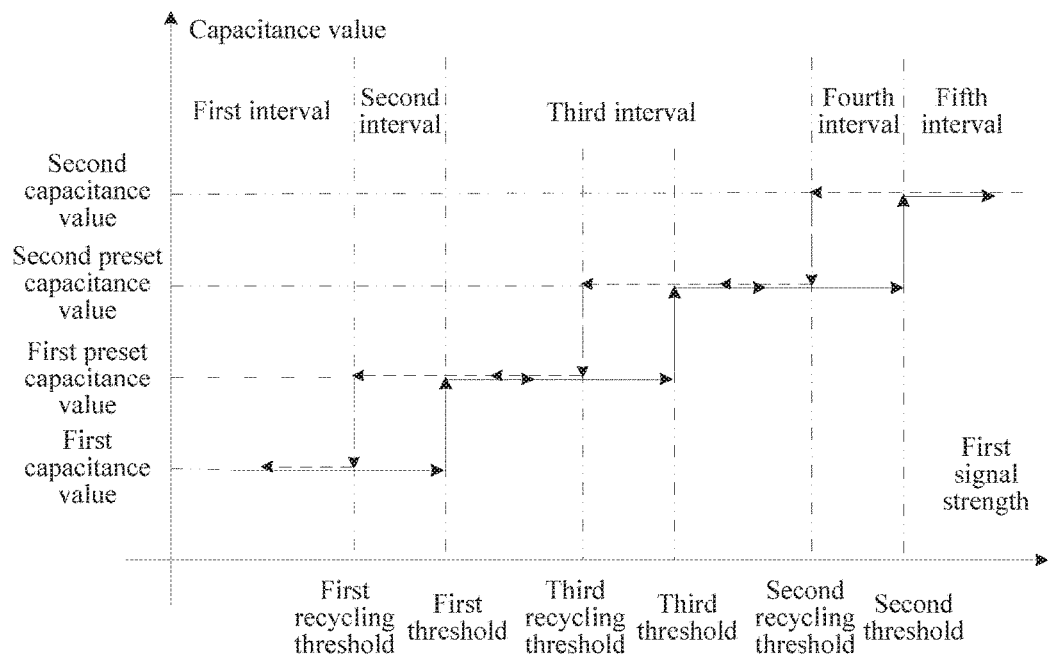
FIG. 6 is a schematic diagram of a variation relationship between a first signal strength and a capacitance value in an antenna adjustment method according to another embodiment of this application.

In another embodiment of this application, one or more thresholds may be further set between the foregoing first threshold and the foregoing second recycling threshold, and the foregoing third interval is divided into multiple subintervals, and corresponding preset capacitance values are set so as to enable multiple communications systems of the antenna having the variable capacitor to achieve best integrated communication quality. An example in which the working frequency band of the antenna is increased as the capacitance value of the variable capacitor is increased is still used. Referring to FIG. 6, a third recycling threshold and a third threshold may be set between the first threshold and the second recycling threshold, where the third recycling threshold is less than the third threshold. When the first signal strength of the first communications system is less than the first recycling threshold, the capacitance value of the variable capacitor in the antenna is set to the first capacitance value corresponding to the working frequency band of the first communications system, when the first signal strength is between the first threshold and the third recycling threshold, the capacitance value of the variable capacitor is set to the first preset capacitance value, when the first signal strength is between the third threshold and the second recycling threshold, the capacitance value of the variable capacitor is set to a second preset capacitance value, when the first signal strength is greater than the second threshold, the capacitance value of the variable capacitor is set to the second capacitance value, and when the first signal strength is between the first recycling threshold and the first threshold, or between the third recycling threshold and the third threshold, or between the second recycling threshold and the second threshold, the capacitance value of the variable capacitor is not changed, where the first preset capacitance value is between the first capacitance value and the second preset capacitance value, and the second preset capacitance value is between the first preset capacitance value and the second capacitance value.

It can be known from the foregoing technical solution that, more thresholds set for the first signal strength indicates more possible values of the variable capacitor, and the working frequency band of the antenna can better meet communication quality requirements on multiple communications systems. In this embodiment of this application, a specific value of each threshold is not limited, and in an actual application, a quantity of thresholds and a specific value of each threshold may be set according to a communication quality requirement on a communications system.

Figure 7:
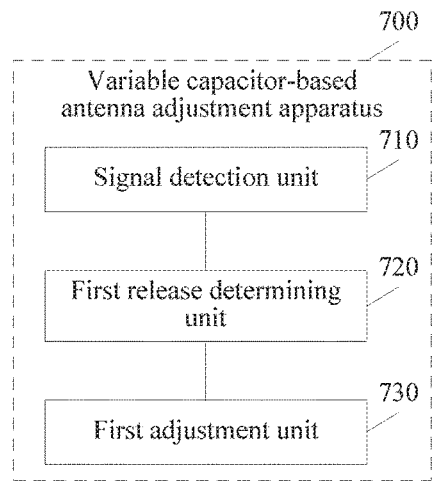
FIG. 7 is a schematic structural diagram of a variable capacitor-based antenna adjustment apparatus according to an embodiment of this application.

Corresponding to the foregoing method embodiment, an embodiment of this application further provides a variable capacitor-based antenna adjustment apparatus, where the variable capacitor-based antenna adjustment apparatus is applied to an antenna having a variable capacitor, and may be entirely or partially integrated into the antenna or may be disposed in a wireless communications terminal independent of the antenna, the antenna having the variable capacitor supports at least two communications systems. As shown in FIG. 7, the variable capacitor-based antenna adjustment apparatus 700 includes the following units a signal detection unit 710 configured to detect a first signal strength of a first communications system supported by the antenna having the variable capacitor, a first release determining unit 720 configured to determine whether the first signal strength meets a first release condition, where the first release condition includes the first signal strength is greater than a first threshold or the first signal strength is not less than the first threshold, and a first adjustment unit 730 configured to, when the first signal strength meets the first release condition, adjust a capacitance value of the variable capacitor to a preset capacitance value.

The preset capacitance value is between the first capacitance value and a second capacitance value, or equal to the second capacitance value, where the first capacitance value is a capacitance value corresponding to a working frequency band of the first communications system, and the second capacitance value is a capacitance value corresponding to a working frequency band of a second communications system supported by the antenna having the variable capacitor.

It can be known from the foregoing technical solution that, according to the variable capacitor-based antenna adjustment apparatus provided by this embodiment of this application, when a first signal strength meets a first release condition, a capacitance value of the variable capacitor is adjusted to a preset capacitance value, and because the preset capacitance value is closer to the second capacitance value, compared with an existing antenna adjustment method in which the capacitance value of the variable capacitor is always maintained at the first capacitance value, in this embodiment of this application, a working frequency band of the antenna having the variable capacitor is closer to a working frequency band of a second communications system, and therefore, communication quality of the second communications system is improved. Although a signal strength of the first communications system is reduced, because the first signal strength is very strong, communication quality of the first communications system is not greatly affected. Therefore, by applying the antenna adjustment apparatus provided by this embodiment of this application, not only communication quality of the first communications system with a relatively high priority can be ensured, but also the communication quality of the second communications system with a relatively low priority can be improved, when a signal of the first communications system is very strong, by adjusting the capacitance value of the variable capacitor, thereby achieving an objective of giving consideration to communication quality of multiple systems supported by the antenna having the variable capacitor.

In a embodiment of this application, the antenna adjustment apparatus 700 may further include a second adjustment unit configured to, when the first signal strength does not meet the first release condition, adjust the capacitance value of the variable capacitor to the first capacitance value.

Figure 8:
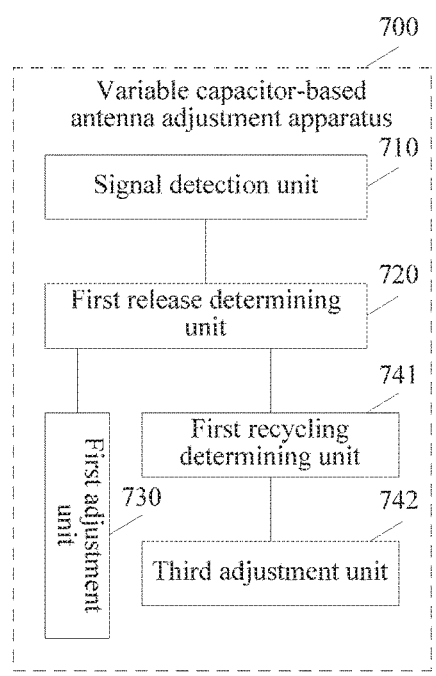
FIG. 8 is a schematic structural diagram of another variable capacitor-based antenna adjustment apparatus according to an embodiment of this application.

Referring to FIG. 8, in another embodiment of this application, the antenna adjustment apparatus 700 may further include a first recycling determining unit 741 configured to, when the first signal strength does not meet the first release condition, determine whether the first signal strength meets a first recycling condition, and a third adjustment unit 742 configured to, when the first signal strength meets the first recycling condition, adjust the capacitance value of the variable capacitor to the first capacitance value, where the first recycling condition includes the first signal strength is less than a first recycling threshold or the first signal strength is not greater than the first recycling threshold, and the first recycling threshold is less than the first threshold.

In this embodiment of this application, when the first signal strength is greater than the first recycling threshold, and the first signal strength is less than the first threshold (neither the first recycling condition nor the first release condition is met), the capacitance value of the variable capacitor is not adjusted, for example, if a detected previous first signal strength is greater than the first threshold, and a corresponding capacitance value of the variable capacitor is the preset capacitance value, when a detected current first signal strength is decreased between the first recycling threshold and the first threshold, the variable capacitor is maintained at the preset capacitance value, and if the detected previous first signal strength is less than the first recycling threshold, and a corresponding capacitance value is the first capacitance value, when the detected current first signal strength is increased between the first recycling threshold and the first threshold, the variable capacitor is maintained at the first capacitance value.

Figure 9:
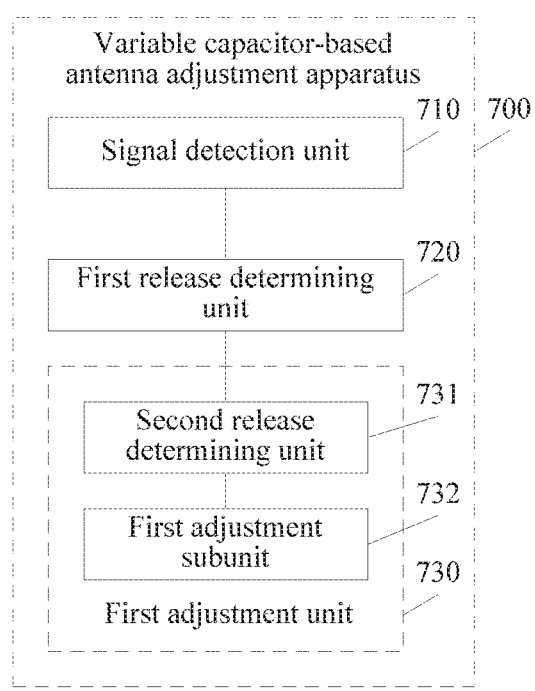
FIG. 9 is a schematic structural diagram of still another variable capacitor-based antenna adjustment apparatus according to an embodiment of this application.

Referring to FIG. 9, in another embodiment of this application, the first adjustment unit 730 includes a second release determining unit 731 configured to determine whether the first signal strength meets a second release condition, where the second release condition includes the first signal strength is greater than a second threshold or the first signal strength is not less than the second threshold, and the second threshold is greater than the first threshold, and a first adjustment subunit 732 configured to, when the first signal strength meets the second release condition, adjust the capacitance value of the variable capacitor to the second capacitance value.

In another embodiment of this application, the first adjustment unit 730 may further include a second adjustment subunit configured to adjust the capacitance value of the variable capacitor to a first preset capacitance value, where the first preset capacitance value is between the first capacitance value and the second capacitance value.

Figure 10:
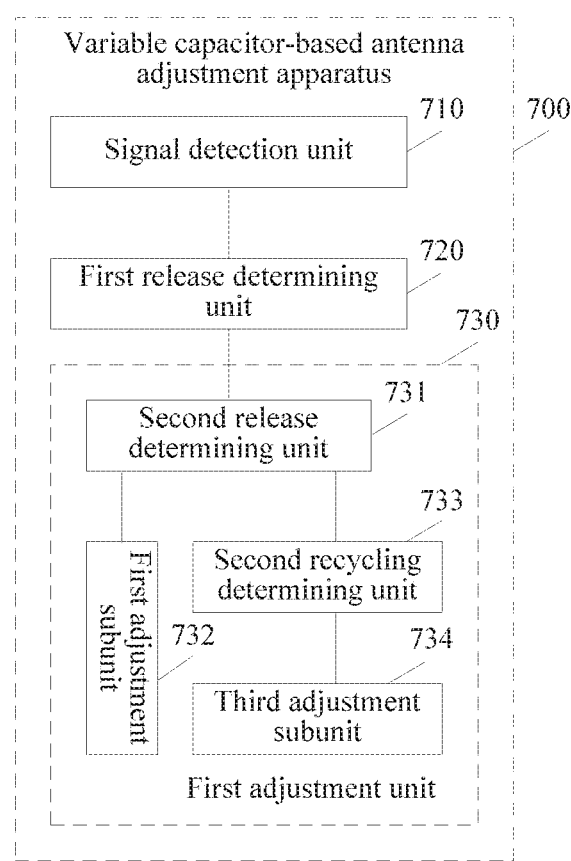
FIG. 10 is a schematic structural diagram of still another variable capacitor-based antenna adjustment apparatus according to an embodiment of this application.

Referring to FIG. 10, in another embodiment of this application, the first adjustment unit 730 may further include a second recycling determining unit 733 configured to, when the first signal strength does not meet the second release condition, determine whether the first signal strength meets a second recycling condition, and a third adjustment subunit 734 configured to, when the first signal strength meets the second recycling condition, adjust the capacitance value of the variable capacitor to the first preset capacitance value, where the second recycling condition includes the first signal strength is less than a second recycling threshold or the first signal strength is not greater than the second recycling threshold, and the second recycling threshold is between the first threshold and the second threshold.

It can be known from the foregoing technical solution that, in this embodiment of this application, the first recycling threshold, the first threshold, the second recycling threshold, and the second threshold are set to divide a signal strength into five intervals, and a first interval, a third interval, and a fifth interval respectively correspond to one capacitance value. The first signal strength of the first communications system with a relatively high priority is detected to determine an interval in which the first signal strength is located. If the first signal strength is located within the first interval, or the third interval, or the fifth interval, the capacitance value of the variable capacitor is set to the capacitance value corresponding to the interval, and if the first signal strength is located within a second interval or a fourth interval, the capacitance value is not adjusted so that not only an objective of giving consideration to communication quality of multiple systems supported by the antenna having the variable capacitor is achieved, but also a "ping-pong effect" of the capacitance value of the variable capacitor can be prevented, a quantity of times of adjustment of the variable capacitor is reduced, and damage to the variable capacitor is reduced.

For ease of description, when the apparatus is described, the apparatus is divided into units according to functions, which are separately described. In implementation of this application, the function of the units may be implemented in a same piece of or multiple pieces of software and/or hardware.

Corresponding to the foregoing antenna adjustment apparatus, an embodiment of this application further provides a wireless communications terminal.

Figure 11:
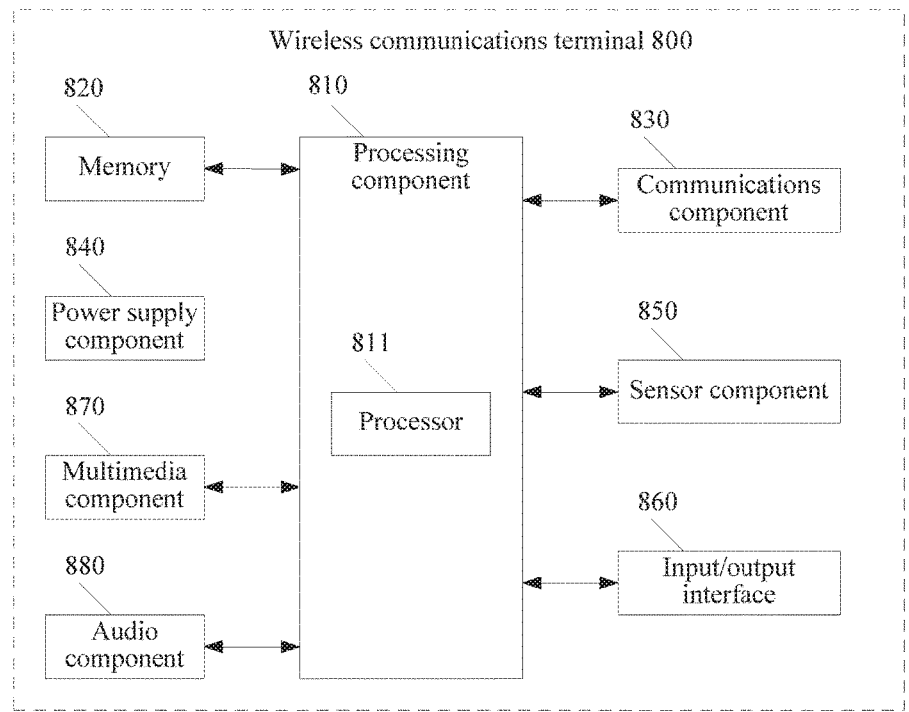
FIG. 11 is a schematic structural diagram of a wireless communications terminal according to an embodiment of this application.

FIG. 11 is a structural block diagram of a wireless communications terminal 800 according to an embodiment of this application, where the wireless communications terminal 800 may be a mobile phone, a tablet device, a notebook computer, or the like.

Referring to FIG. 11, the wireless communications terminal 800 provided by this embodiment of this application may include one or more of the following components. A processing component 810, a memory 820, a communications component 830, a power supply component 840, a sensor component 850, an input/output (I/O) interface 860, a multimedia component 870, and/or an audio component 880.

The processing component 810 generally controls overall operations, such as operations associated with displaying, a phone call, data communication, a camera operation, and a recording operation, of the wireless communications terminal. The processing component 810 may include one or more processors 811 for executing a local or remote instruction. In addition, the processing component 810 may include one or more modules so as to facilitate interaction between the processing component 810 and another component.

The memory 820 is configured to store data of various types to support operations on the wireless communications terminal. The memory 820 may be implemented by a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc.

The power supply component 840 supplies power to components of the wireless communications terminal.

The sensor component 850 includes one or more sensors configured to provide status evaluation in each aspect for the wireless communications terminal.

The I/O component 860 provides an interface between the processing component 810 and a peripheral interface module, where the peripheral interface module may be a keyboard, a click wheel, a button, or the like. The button may include, but is not limited to, a home button, a volume button, a start-up button, and/or a lock button.

The multimedia component 870 includes a screen of an output interface provided between the wireless communications terminal and a user. In some embodiments, the screen may include a liquid crystal display (LCD) and a touch panel (TP). In some embodiments, the multimedia component 870 may further includes a front-facing camera and/or a rear-facing camera.

The audio component 880 is configured to output/input an audio signal. For example, the audio component 880 includes a microphone (MIC), a loudspeaker, and the like.

The communications component 830 is configured to facilitate wired or wireless communication between the wireless communications terminal and another device. The wireless communications terminal may access a communications standard-based wireless network such as Wi-Fi, second generation wireless telephone technology (2G) or third generation wireless telephone technology (3G), or a combination thereof.

Figure 12:
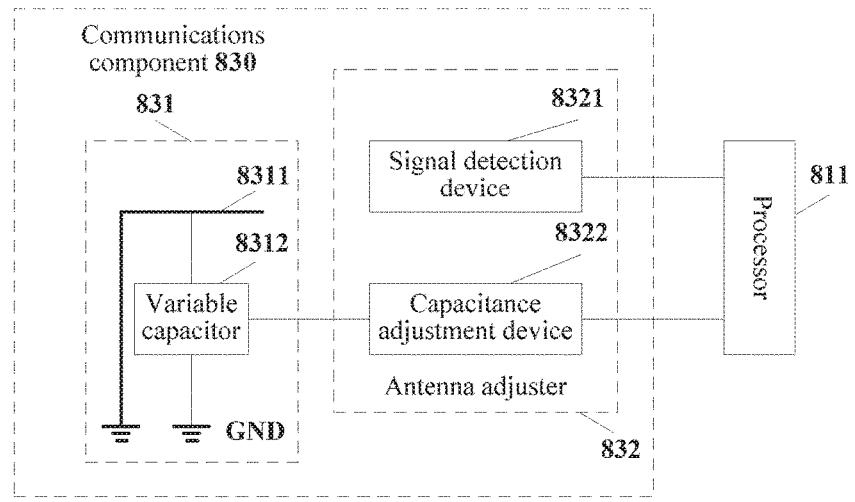
FIG. 12 is a schematic structural diagram of a communications component in FIG. 11.

Referring to FIG. 12, in another embodiment of this application, the communications component 830 includes an antenna 831 having a variable capacitor and an antenna adjuster 832, and may further include at least one of a transmitter circuit and a receiver circuit (not shown in the figure). The antenna 831 having the variable capacitor includes an antenna element 8311 and a variable capacitor 8312, and the variable capacitor 8312 is connected between the antenna element 8311 and ground potential (GND); and the antenna 831 having the variable capacitor supports at least two communications systems, where a first communications system has a highest priority, for example, a communication quality requirement on the first communications system is preferentially met. The antenna adjuster 832 is configured to adjust a capacitance value of the variable capacitor 8312 so as to adjust a working frequency of the antenna 831 having the variable capacitor. The antenna adjuster 832 includes a signal detection device 8321 and a capacitance adjustment device 8322. The signal detection device 8321 and the capacitance adjustment device 8322 are separately connected to a processor 811 of the processing component 810. The signal detection device 8321 is configured to detect a first signal strength of the first communications system that is received by the antenna 831 having the variable capacitor, and send the first signal strength to the processor 811. The processor 811 executes, according to a detection result (for example, the first signal strength) output by the signal detection device 8321, an instruction stored in the memory 820, generates a corresponding drive signaling, and sends the corresponding drive signaling to the capacitance adjustment device 8322. The capacitance adjustment device 8322 adjusts, according to the drive signaling, a capacitance value of the variable capacitor 8312, and implements the foregoing antenna adjustment method so as to improve communication quality of another communications system under the premise that the communication quality requirement on the first communications system is met.

In an embodiment of this application, the signal detection device 8321 includes a signal amplifier, an adjustable attenuator, a radio frequency transformer, and a power to voltage conversion circuit, and the working principle thereof is that the signal amplifier amplifies a collected signal (for subsequent processing), the adjustable attenuator controls the amplified signal within a particular range, the signal after the attenuation is converted into a differential input signal by the radio frequency transformer, and the power to voltage conversion circuit converts the differential input signal into a corresponding direct current level and output the corresponding direct current level to the processor 811 (a linear relationship exists between the direct current level and a signal strength), and then the processor may convert the direct current level into a digital signal by using a built-in analog to digital conversion module to compare with each threshold.

Figure 13:
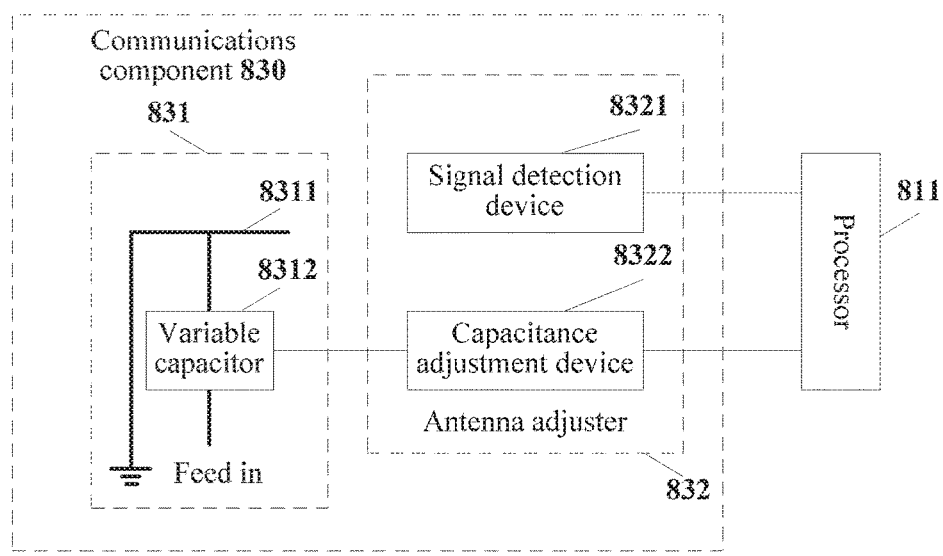
FIG. 13 is another schematic structural diagram of the communications component in FIG. 11.

In the antenna having the variable capacitor according to this embodiment of this application, the variable capacitor 8312 may be connected to a ground path of the element 8311, as shown in FIG. 12, or may be connected to a feed end of the element 8311, as shown in FIG. 13.

The capacitance adjustment device 8322 may be a current drive circuit, a voltage drive circuit, or the like, and adjusts the capacitance value of the variable capacitor 8312 by outputting a drive signal corresponding to the capacitance value to the variable capacitor 8312, for example, the current drive circuit may output a current drive signal corresponding to the capacitance value to the variable capacitor 8312, and the voltage drive circuit may output a voltage drive signal corresponding to the capacitance value to the variable capacitor 8312.

The embodiments in this specification are all described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly. For related parts, reference may be made to partial descriptions in the method embodiment. The described apparatus and system embodiments are merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. A person of ordinary skill in the art may understand and implement the solutions of the embodiments without creative efforts.

The foregoing descriptions are merely specific implementation manners of this application. It should be noted that a person of ordinary skill in the art may make several improvements or polishing without departing from the principle of this application and the improvements or polishing shall fall within the protection scope of this application.

What is claimed is:

1. An antenna adjustment method of an antenna for supporting at least two communications systems, the antenna adjustment method comprising:
   detecting a first signal strength of a first communications system supported by the antenna;
   determining whether the first signal strength meets a first release condition, the first release condition being the first signal strength is not less than a first signal strength threshold;
   adjusting a capacitance value of a variable capacitor of the antenna to a preset capacitance value when the first signal strength meets the first release condition, the preset capacitance value being between a first capacitance value and not exceeding a second capacitance value, the first capacitance value being a capacitance value corresponding to a first working frequency band of the first communications system, and the second capacitance value being a capacitance value corresponding to a second working frequency band of a second communications system supported by the antenna;
   determining whether the first signal strength meets a first recycling condition when the first signal strength does not meet the first release condition; and
   adjusting the capacitance value of the variable capacitor of the antenna to the first capacitance value when the first signal strength meets the first recycling condition, the first recycling condition being where the first signal strength is not greater than the first recycling signal strength threshold and where the first recycling signal strength threshold is less than the first signal strength threshold.

2. The antenna adjustment method according to claim 1, further comprising adjusting the capacitance value of the variable capacitor of the antenna to the first capacitance value when the first signal strength does not meet the first release condition.

3. The antenna adjustment method according claim 1, wherein adjusting the capacitance value of the variable capacitor of the antenna to the preset capacitance value comprises:
   determining whether the first signal strength meets a second release condition; and
   adjusting the capacitance value of the variable capacitor of the antenna to the second capacitance value when the first signal strength meets the second release condition, the second release condition being where the first signal strength is not less than the second signal strength threshold and where the second signal strength threshold is greater than the first signal strength threshold.

4. The antenna adjustment method according to claim 3, further comprising adjusting the capacitance value of the variable capacitor of the antenna to a first preset capacitance value when the first signal strength does not meet the second release condition, the preset capacitance value being the first preset capacitance value and being a capacitance value between the first capacitance value and the second capacitance value.

5. The antenna adjustment method according to claim 3, further comprising:
   determining whether the first signal strength meets a second recycling condition when the first signal strength does not meet the second release condition; and
   adjusting the capacitance value of the variable capacitor of the antenna to a first preset capacitance value when the first signal strength meets the second recycling condition, the second recycling condition being where the first signal strength is not greater than the second recycling signal strength threshold and where the second recycling signal strength threshold is between the first signal strength threshold and the second signal strength threshold.

6. An antenna adjustment apparatus, comprising a processor,
   the processor being configured to:
   detect a first signal strength of a first communications system supported by an antenna of the apparatus;
   determine whether the first signal strength meets a first release condition, the first release condition being the first signal strength is not less than a first signal strength threshold;
   adjust a capacitance value of a variable capacitor of the antenna to a preset capacitance value when the first signal strength meets the first release condition, the preset capacitance value being between a first capacitance value and not exceeding a second capacitance value, the first capacitance value being a capacitance value corresponding to a first working frequency band of the first communications system, and the second capacitance value being a capacitance value corresponding to a second working frequency band of a second communications system supported by the antenna;
   determine whether the first signal strength meets a first recycling condition when the first signal strength does not meet the first release condition; and
   adjust the capacitance value of the variable capacitor to the first capacitance value when the first signal strength meets the first recycling condition, the first recycling condition being where the first signal strength is not greater than the first recycling signal strength threshold and where the first recycling signal strength threshold is less than the first signal strength threshold.

7. The antenna adjustment apparatus according to claim 6, wherein the processor is further configured to adjust the capacitance value of the variable capacitor to the first capacitance value when the first signal strength does not meet the first release condition.

8. The antenna adjustment apparatus according to claim 6, wherein the processor is further configured to:

determine whether the first signal strength meets a second release condition; and adjust the capacitance value of the variable capacitor to the second capacitance value when the first signal strength meets the second release condition, and the second release condition being where the first signal strength is not less than the second signal strength threshold and where the second signal strength threshold is greater than the first signal strength threshold.

9. The antenna adjustment apparatus according to claim 8, wherein the processor is further configured to adjust the capacitance value of the variable capacitor to a first preset capacitance value when the first signal strength does not meet the second release condition, the preset capacitance value comprising the first preset capacitance value and being a capacitance value between the first capacitance value and the second capacitance value.

10. The antenna adjustment apparatus according to claim 8, wherein the processor is further configured to:

determine whether the first signal strength meets a second recycling condition when the first signal strength does not meet the second release condition; and adjust the capacitance value of the variable capacitor to a first preset capacitance value when the first signal strength meets the second recycling condition, and the second recycling condition being where the first signal strength is not greater than the second recycling threshold signal strength and where the second recycling signal strength threshold is between the first signal strength threshold and the second signal strength threshold.

11. A wireless communications terminal, comprising:

an antenna comprising a variable capacitor, the antenna supporting at least two communications systems; and a processor coupled to the antenna, the processor being configured to:

detect a first signal strength of a first communications system supported by the antenna;

adjust a capacitance value of the variable capacitor to a preset capacitance value when the first signal strength meets a first release condition, the first release condition being the first signal strength is not less than a first signal strength threshold, the preset capacitance value being between a first capacitance value and not exceeding a second capacitance value, the first capacitance value being a capacitance value corresponding to a first working frequency band of the first communications system, and the second capacitance value being a capacitance value corresponding to a second working frequency band of a second communications system supported by the antenna; and adjust the capacitance value of the variable capacitor to the first capacitance value when the first signal strength meets a first recycling condition and does not meet the first release condition, the first recycling condition being where the first signal strength is not greater than a first recycling signal strength threshold and where the first recycling signal strength threshold is less than the first signal strength threshold.

* * * * *